(12) United States Patent
Kaizu et al.

(10) Patent No.: US 8,611,045 B2
(45) Date of Patent: Dec. 17, 2013

(54) MAGNETIC RECORDING APPARATUS

(75) Inventors: Akimasa Kaizu, Tokyo (JP); Tsutomu Aoyama, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 188 days.

(21) Appl. No.: 13/248,187

(22) Filed: Sep. 29, 2011

(65) Prior Publication Data
US 2013/0083428 A1   Apr. 4, 2013

(51) Int. Cl.
*G11B 5/39*   (2006.01)

(52) U.S. Cl.
USPC .................................. 360/125.02

(58) Field of Classification Search
USPC .................................. 360/125.02
See application file for complete search history.

(56) References Cited

U.S. PATENT DOCUMENTS

| | | | |
|---|---|---|---|
| 5,693,426 A * | 12/1997 | Lee et al. | 428/611 |
| 5,800,931 A * | 9/1998 | Lee et al. | 428/611 |
| 6,714,389 B1 * | 3/2004 | Pokhil et al. | 360/324.12 |
| 6,881,497 B2 * | 4/2005 | Coffey et al. | 428/828.1 |
| 2009/0237844 A1 * | 9/2009 | Duric et al. | 360/324 |
| 2010/0073804 A1 | 3/2010 | Ikeda et al. | |
| 2011/0122525 A1 | 5/2011 | Nemoto et al. | |

OTHER PUBLICATIONS

Jian-Gang Zhu, Xiaochun Zhu, and Yuhui Tang, "Microwave Assisted Magnetic Recording", IEEE Transactions on Magnetics, vol. 44, No. 1 (Jan. 2008) pp. 125-131.

* cited by examiner

*Primary Examiner* — Mark Blouin
(74) *Attorney, Agent, or Firm* — Posz Law Group, PLC

(57) ABSTRACT

A magnetic recording apparatus includes a magnetic recording medium that is provided with a first magnetic layer with magneto crystalline anisotropy energy, a second magnetic layer with magneto crystalline anisotropy energy that is smaller than the magneto crystalline anisotropy energy of the first magnetic layer, and a nonmagnetic metal layer that is positioned between the first magnetic layer and the second magnetic layer and that provides coupling force between the first magnetic layer and the second magnetic layer; and a magnetic head that includes a main pole that applies a recording magnetic field in a direction perpendicular to a film surface of the magnetic recording medium to the magnetic recording medium, and an alternate current (AC) magnetic field generator that applies an AC magnetic field with a frequency of 1-40 GHz to the magnetic recording medium.

12 Claims, 7 Drawing Sheets

MAGNETIC RECORDING APPARATUS

BACKGROUND OF THE INVENTION

1. Field of the Invention

The present invention relates to a magnetic recording apparatus and relates to, in particular, a magnetic recording apparatus using an exchange coupled composite (ECC) medium.

2. Description of the Related Art

In hard disk devices, an improvement has been demanded in the performance of magnetic recording media to improve a magnetic recording density. When increasing the magnetic recording density, it needs to decrease the sizes of magnetic grains configuring a medium in order to maintain a signal quality (signal to noise (S/N) ratio) necessary for reproduction. However, when the sizes of the magnetic grains are decreased, the volume of the magnetic grains decreases and thereby magnetization loss due to thermal fluctuation becomes more likely to occur. In order to prevent this and to maintain a stable recording state, it needs to enhance magneto crystalline anisotropy energy (hereinafter, may be simply referred to as Hk) of the magnetic grains. However, when a material with large magneto crystalline anisotropy energy is used, an internal magnetic field (coercive force Hc and saturation magnetic field Hs) of the magnetic recording medium becomes large so that a strong recording magnetic field is needed to record to the magnetic recording medium. On the other hand, because the strength of a magnetic field that a magnetic head generates is limited by a material and a shape of a magnetic head, the recording may become difficult.

As a method to solve such a drawback, an ECC magnetic recording medium is discussed. The ECC magnetic recording medium includes a magnetic layer with small magneto crystalline anisotropy energy (hereinafter, referred to as a low Hk magnetic layer), a magnetic layer with large magneto crystalline anisotropy energy (hereinafter, referred to as a high Hk magnetic layer), and a nonmagnetic metal layer sandwiched between these magnetic layers. The low Hk magnetic layer and the high Hk magnetic layer are exchange-coupled through the nonmagnetic metal layer, and configure a recording layer together. By disposing the low Hk magnetic layer in a magnetic head side that is an upper layer side of the recording medium, a magnetization of the low Hk magnetic layer can be oriented in a magnetization hard axis direction (direction orthogonal to a magnetization easy axis) by a small magnetic field. A magnetization direction of the high Hk magnetic layer is oriented in the magnetization hard axis direction due to an exchange coupling force with the low Hk magnetic layer. Thereby, a magnetization direction of the recording layer can be oriented in a preferred direction by a small recording magnetic field, and thermal stability of the recording layer can be maintained. The specification of U.S. Patent Application Publication No. 2011/0122525 should be referred.

In the ECC magnetic recording medium, it is necessary to maintain a balance between the strength of a necessary recording magnetic field and thermal stability. In other words, when Hk of the low Hk magnetic layer is large, the necessary recording magnetic field becomes large and thereby an effect on a configuration of the magnetic head increases. When Hk of the low Hk magnetic layer is small, it becomes difficult to rotate the magnetization direction of the high Hk magnetic layer and thereby a necessity to lower Hk of the high Hk magnetic layer occurs. As a result, the thermal stability of the entire recording layer declines and this restricts the higher recording density. As described above, in the ECC magnetic recording medium, flexibility of a film configuration is low and there are also limitations to a coping ability of the magnetic head.

It is objective of the present invention to provide a magnetic recording apparatus that is provided with an ECC magnetic recording medium as a magnetic recording medium, that can realize a large recording density with a small recording magnetic field, and that can increase flexibility of a film configuration of the ECC magnetic recording medium.

SUMMARY

A magnetic recording apparatus of the present invention includes a magnetic recording medium that is provided with a first magnetic layer with magneto crystalline anisotropy energy, a second magnetic layer with magneto crystalline anisotropy energy that is smaller than the magneto crystalline anisotropy energy of the first magnetic layer, and a nonmagnetic metal layer that is positioned between the first magnetic layer and the second magnetic layer and that provides coupling force between the first magnetic layer and the second magnetic layer; and a magnetic head that includes a main pole that applies a recording magnetic field in a direction perpendicular to a film surface of the magnetic recording medium to the magnetic recording medium, and an alternate current (AC) magnetic field generator that applies an AC magnetic field with a frequency of 1-40 GHz to the magnetic recording medium.

The AC magnetic field generator generates an AC magnetic field in a so-called microwave band. The microwave band is a frequency (1-40 GHz) corresponding to a ferromagnetic resonant frequency of the magnetic recording medium. An AC magnetic field with such a high frequency promotes spin movement of magnetic grains configuring the first and second magnetic layers. When a recording magnetic field is applied in such a state, a magnetization direction of the second magnetic layer with small Hk first rotates in a direction of the recording magnetic field, and then, a magnetization direction of the first magnetic layer with large Hk rotates due to exchange coupling force with the second magnetic layer. Applying the AC magnetic field leads the first and second magnetic layers to a state where the magnetization directions are more likely to rotate, and therefore the magnetization directions of the first and second magnetic layers can rotate with the small recording magnetic field. Also, from the same reason, it is easy to increase Hks of the first and second magnetic layers. As a result, it becomes possible to increase the thermal stability of the magnetic recording medium and to increase a recording density.

As described above, according to the present invention, restriction on Hks of the first and second magnetic layers is small. In addition to this, as long as a function of the AC magnetic field reaches to the first and second magnetic layers, a positional relation between the first and second magnetic layers are not restricted at all. Therefore, restriction on a film configuration of the magnetic recording medium is also small.

As described above, according to present invention, it is possible to provide a magnetic recording apparatus that is provided with an ECC magnetic recording medium as a magnetic recording medium, that can achieve a large recording density with a small recording magnetic field, and that can increase flexibility of a film configuration of the ECC magnetic recording medium.

The above description, as well as other objects, features, and advantages of the present specification will be evident by the detailed description that follows below with reference to attached drawings illustrating the present specification.

DETAILED DESCRIPTION OF THE INVENTION

Figure 1:
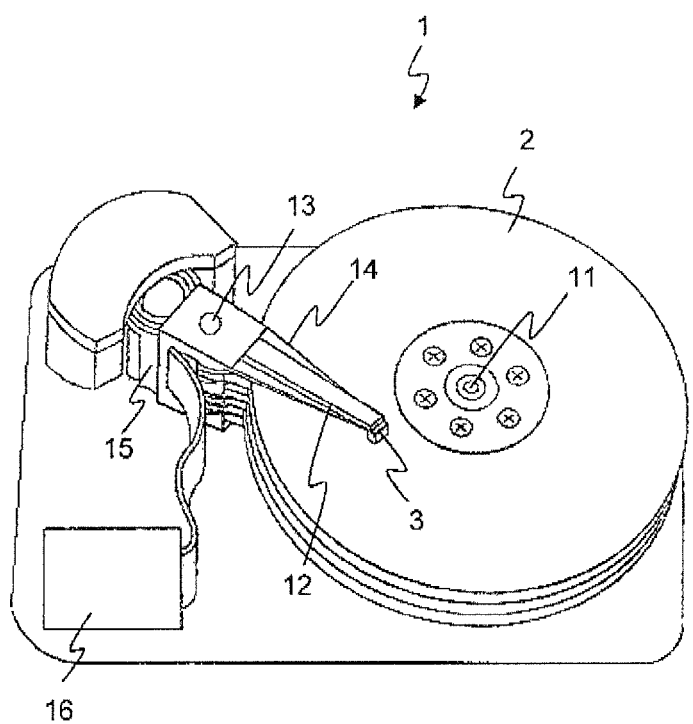
FIG. 1 is a conceptual view of a magnetic recording apparatus according to one embodiment of the present invention.

FIG. 1 is a conceptual view of a magnetic recording apparatus 1 according to one embodiment of the present invention. The magnetic recording apparatus 1 includes multiple disk-shaped magnetic recording media 2 (hard disks) that are rotatably attached to a spindle motor 11. For each of the magnetic recording media 2, two magnetic heads 3 are arranged in a manner of sandwiching the magnetic recording medium 2 and opposing each other. The magnetic head 3 has a substantially hexahedral shape, and one surface of the six outer surfaces is an air bearing surface S that opposes the magnetic recording medium 2 (see FIG. 2). The magnetic head 3 configures a portion of a head gimbal assembly 12, and the head gimbal assembly 12 is linked to a driving arm 14 that is rotatably supported by a pivot bearing shaft 13. When the magnetic recording medium 2 is rotatably driven, the magnetic head 3 flies above a surface of the magnetic recording medium 2 due to air flow passing through between the magnetic recording medium 2 and the magnetic head 3. When the driving arm 14 rotates around the pivot bearing shaft 13 by a voice coil motor 15, the magnetic head 3 can move in a radial direction of the magnetic recording medium 2. The magnetic recording apparatus 1 further includes a control device 16 mounting a head amplifier and a control part of an alternate current (AC) magnetic field generator 55, which will be described later.

Figure 2:
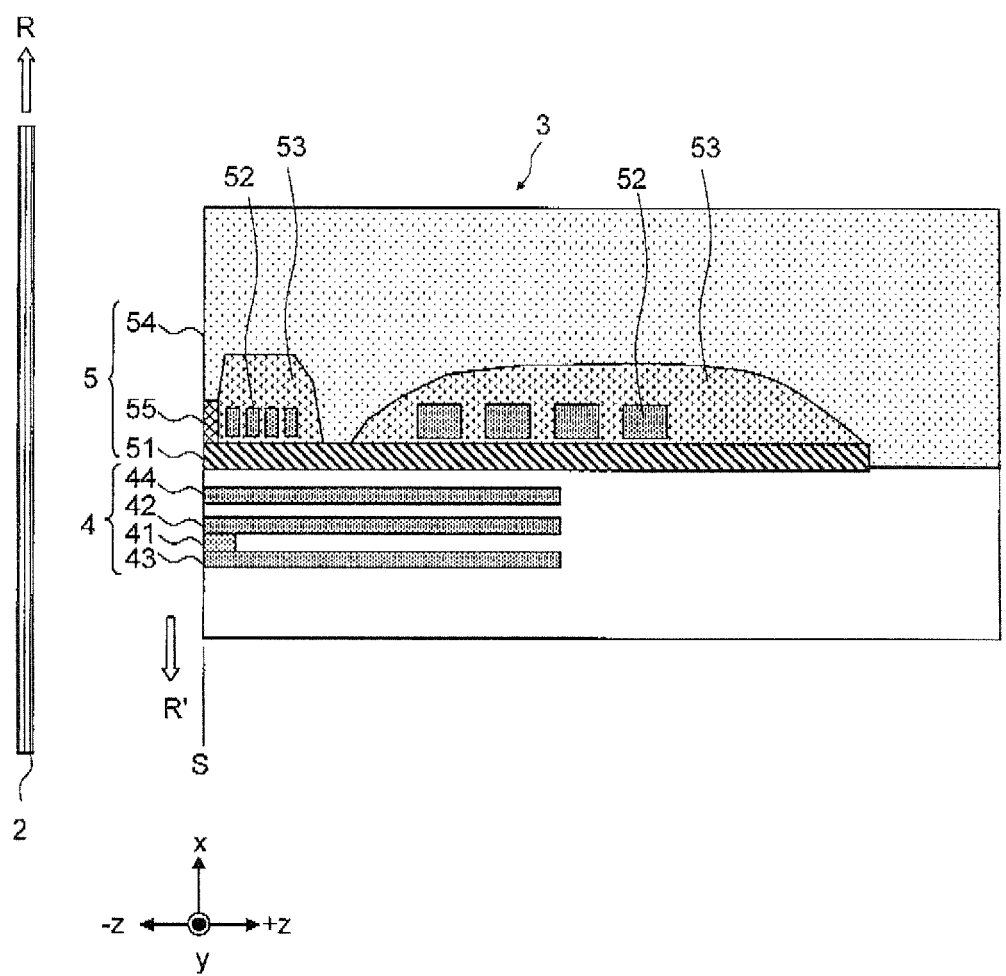
FIG. 2 is a conceptual cross-sectional view of a magnetic head.

FIG. 2 illustrates a conceptual cross-sectional view of the magnetic head 3. The magnetic head 3 includes a substrate (not illustrated) formed from $Al_2O_3 \cdot TiC$, and a reproducing head part 4 and a recording head part 5 formed above the substrate. The magnetic head 3 of the present embodiment should include at least the recording head part 5. The reproducing head part 4 includes a spin-valve type magneto resistive (MR) element 41 that is disposed on a front side of a recording head part 5, first and second shield layers 42 and 43 that magnetically shield the MR element 41, and an interelement shield 44 that is positioned between the recording head part 5 and the reproducing head part 4. The first shield layer 42 is disposed on the rear side of the MR element 41 and the second shield layer 43 is disposed on the front side of the MR element 41. Herein, "front side" and "rear side" are based on a relative traveling direction R' (opposite direction to a rotating direction R of the magnetic recording medium 2) of the magnetic head 3 with respect to the magnetic recording medium 2.

When a sense current flows in the MR element 41, a spin-dependent scattering of conductive electrons in the sense current changes according to the orientation and the strength of the external magnetic field so that magnetoresistive change occurs. Detecting the magnetoresistive change allows magnetic information recorded to the magnetic recording medium 2 to be read.

To the MR element 41, any configuration using magnetoresistive effect can be applied such as a current in plane (CIP)-gigantic magneto resistive (GMR) element in which a sense current flows in a direction parallel to a film surface, a current perpendicular to plane (CPP)-GMR element in which a sense current flows in a direction perpendicular to the film surface, and a tunneling magneto resistive (TMR) element using a tunnel effect. The first and second shield layers 42 and 43 are used as electrodes as well for supplying a sense current when the CPP-GMR element and the TMR element are applied.

The recording head part 5 includes a main pole 51 that generates a recording magnetic field and applies a recording magnetic field in a direction perpendicular to a film surface of the magnetic recording medium 2 to the magnetic recording medium 2, and an excitation coil 52 that is covered by an insulating layer 53 and winds around the periphery of the main pole 51. The main pole 51 can be formed using various soft magnetic materials such as an alloy including Co, an alloy including Fe, an alloy including Fe and Co, an alloy including Fe and Ni, an alloy including Fe and N, an alloy including Fe and Al or the like. The insulating layer 53 and the main pole 51 are covered by a trailing shield 54 disposed on the rear side of the main pole 51. The trailing shield 54 is formed of $Al_2O_3$. Due to the current applied from an external to the excitation coil 52, a magnetic flux is generated to the main pole 51, and then the magnetic flux is discharged in the direction perpendicular to the film surface of the magnetic recording medium 2 from a tip end part of the main pole 51 positioned at the air bearing surface S.

Figure 3A:
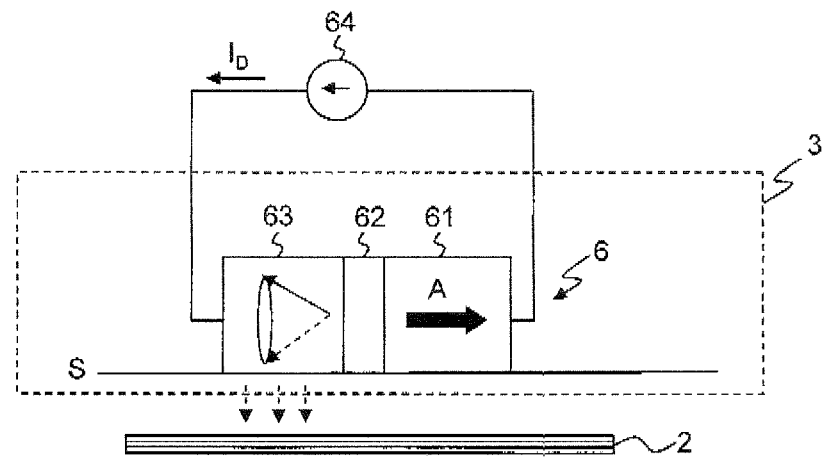
FIGS. 3A and 3B are conceptual views of microwave generators.

The recording head part 5 is provided also with an AC magnetic field generator 55 that applies an AC magnetic field (microwave) that applies the recording magnetic field in the direction perpendicular to the film surface of the magnetic recording medium 2. "Film surface" refers a surface of the magnetic recording medium 2 that is parallel to a surface opposing the recording head part 5. FIG. 3A illustrates a conceptual view (illustrates as a plan view parallel to the x-z plane of FIG. 2) of a microwave generator 6 which is an example of the AC magnetic field generator 55. Illustrated in this figure is a type called a spin torque oscillator (STO) which is described in, for example, J. G. Zhu and X. Zhu, Microwave Assisted Magnetic Recording, 'IEEE TRANSACTIONS ON MAGNETICS' VOL. 44, NO. 1 (2008).

The microwave generator 6 includes a hard magnetic layer 61 of which a magnetization direction is pinned in one direction indicated as the arrow A, a microwave generating layer 63, and a nonmagnetic intermediate layer 62 disposed between these. The hard magnetic layer 61 and the microwave generating layer 63 are connected to a direct current (DC) power source 64 through non-illustrated electrode layers. When the DC current $I_D$ flows from the microwave generating layer 63 toward the hard magnetic layer 61, the conductive electrons are injected into the hard magnetic layer 61 from an electrode connected to the hard magnetic layer 61. Spin directions of the conductive electrons randomly distribute. Conductive electrons with spins in the same direction as the magnetization direction A of the hard magnetic layer 61 is more likely to pass through the hard magnetic layer 61 due to a spin polarization effect of the hard magnetic layer 61; conductive electrons with spins in the opposite direction is less likely to pass through the hard magnetic layer 61 because of being refracted inside the layer of the hard magnetic layer 61. As a result, the conductive electrons with the spins in the same direction as the magnetization direction of the hard magnetic layer 61 are filtered (spin-polarized) at the hard magnetic layer 61, pass through the nonmagnetic intermediate layer 62, and flow into the microwave generating layer 63.

The microwave generating layer 63 is formed of a magnetic layer, and its magnetization direction is oriented in an orientation (initial magnetization direction) antiparallel to the magnetization direction A of the hard magnetic layer 61. The spin-polarized conductive electrons apply torque (spin torque) that reverses the magnetization direction of the microwave generating layer 63 to the microwave generating layer 63; on the other hand, damping torque of the microwave generating layer 63 itself resists the spin torque. Therefore, the magnetization direction of the microwave generating layer 63 does not completely reverse, and precession movement occurs centering the initial magnetization direction of the microwave generating layer 63. The magnetization direction of the microwave generating layer 63 periodically oscillates due to the precession movement to generate an AC magnetic field (microwave) with the same frequency as the precession movement.

Figure 3B:
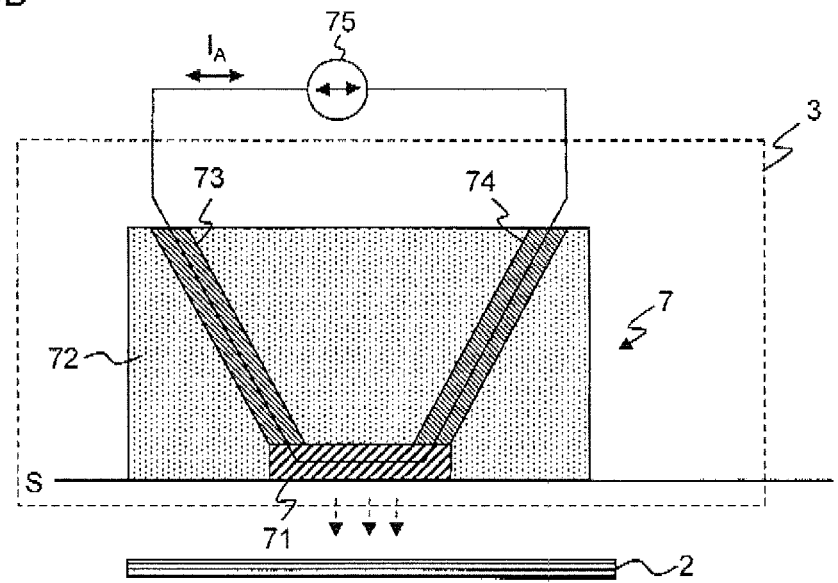

FIG. 3B illustrates a microwave generator 7 that is another type (illustrated as a plan view parallel to the y-z plane of FIG. 2). Illustrated in this figure is a type called a microstripline type that is disclosed in, for example, U.S. Patent Application Publication 2010/0073804.

The microwave generator 7 includes a conductive line path 71 formed from a metal conductor such as Au, Cu, or the like, and a dielectric body layer 72 that covers the conductive line path 71. One surface of the conductive line path 71 is exposed to the air bearing surface S, and the other portions are covered by the dielectric body layer 72. Both ends of the conductive line path 71 are connected to electrodes 73 and 74. The electrodes 73 and 74 are connected to an AC power source 75 through pads (not illustrated) disposed on the surface of the magnetic head 3.

The microwave generator 7 forms a microstrip waveguide together with the magnetic recording medium 2 positioned opposing the microwave generator 7. When an AC current $I_A$ flows in the conductive line path 71 via the electrodes 73 and 74, an AC magnetic field is induced, and the induced AC magnetic field is applied to the magnetic recording medium 2.

The frequency of the AC magnetic field (microwave) that the above-described AC magnetic field generator 55 (microwave generators 6 and 7) generates is preferred to be in the range that is generally called as a microwave band, and specifically is preferred to be in the frequency band of 1-40 GHz. When using the spin torque oscillator, the frequency can be adjusted by saturation magnetization Ms of the microwave generating layer 63, the gyro magnetic constant γ (also referred to as a magnetic rotation ratio and a gyromagnetic ratio) or the like. When using the microstripline type, the frequency of an AC current to be applied itself becomes the frequency of the AC magnetic field.

Figure 4A:
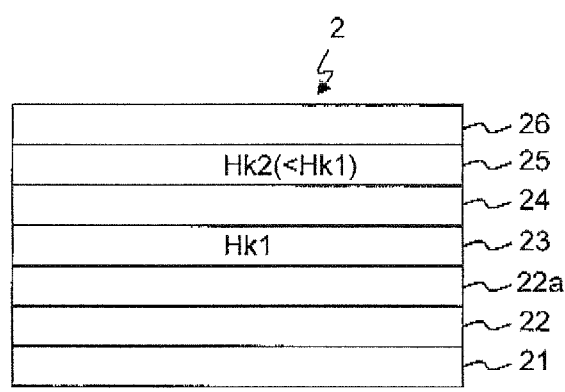
FIGS. 4A and 4B are conceptual cross-sectional views illustrating configurations of magnetic recording media.

Next, a description regarding a configuration of the magnetic recording medium 2 is given using FIG. 4A. The magnetic recording medium 2 is formed by laminating a substrate 21, a soft magnetic under layer 22, a nonmagnetic metal layer 22a, a first magnetic layer 23, a nonmagnetic metal layer 24, a second magnetic layer 25, and a protective layer 26.

The substrate 21 can be formed from nonmagnetic materials such as a glass, an Al alloy covered by NiP, Si, $Al_2O_3$, or the like.

The soft magnetic under layer 22 is disposed to guide the recording magnetic field, which comes from the magnetic head 3, from the surface of the magnetic recording medium 2 to the inside, and a Fe alloy, a Co amorphous alloy, ferrite, or the like can be used. The soft magnetic under layer 22 may also have a lamination configuration of a layer having a soft magnetic layer and a nonmagnetic layer. Between the soft magnetic under layer 22 and the first magnetic layer 23, the nonmagnetic metal layer 22a such as Ru or the like can be disposed.

Figure 4B:
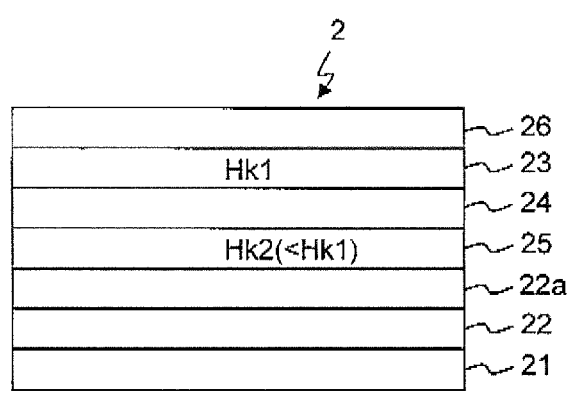

The first and second magnetic layers 23 and 25 can be formed of an alloy including Co and Cr such as a CoCrPt alloy or the like, an alloy including Co and Pt, an alloy including Co and Pd, an alloy including Fe and Pt, an alloy including Fe and Co, a stack of these, a material that ferromagnetic grains such as CoPt or the like are included in a matrix state in an oxide such as $SiO_2$ or the like, and so on. The first magnetic layer 23 has magneto crystalline anisotropy energy Hk1, and the second magnetic layer 25 has magneto crystalline anisotropy energy Hk2 that is smaller than Hk1. As described in detail in an example, Hk2/Hk1 is preferred to be in the range of 0.2 or more and 0.9 or less, and Hk1 is preferred to be in the range of 1193 kA/m (15 kOe) or more and 6366 kA/m (80 kOe) or less. In the present embodiment, the second magnetic layer 25 is positioned closer to the magnetic head 3 than the first magnetic layer 23; however, as illustrated in FIG. 4B, the first magnetic layer 23 may be also positioned closer to the magnetic head 3 than the second magnetic layer 25. In other words, the first magnetic layer 23 and the second magnetic layer 25 are exchangeable to each other sandwiching a nonmagnetic metal layer 24 therebetween.

The nonmagnetic metal layer 24 is positioned between the first magnetic layer 23 and the second magnetic layer 25, and gives a coupling force between the first magnetic layer 23 and the second magnetic layer 25. The nonmagnetic metal layer 24 is formed from a material such as Ru or the like, and exchange coupling force is adjusted by a film thickness. Because the first magnetic layer 23 and the second magnetic layer 25 entirely form the recording layer of the magnetic recording medium 2, it is preferred that magnetization polarities of the first magnetic layer 23 and the second magnetic layer are the same; however, it may be practical even that the magnetization polarities are partially not identical.

The protective layer 26 is used for protecting layers that are on the lower layer side of the protective layer 26, and is formed of diamond like carbon (DLC). Also by disposing a lubricant layer (not illustrated) on an upper layer side of the DLC layer and combining with the protective layer 26, the protective effect for the layers increases.

Next, a description is given regarding functions of the magnetic recording apparatus 1 during writing using the film configuration of FIG. 4A as an example. When recording magnetic information to the magnetic recording medium 2, while a magnetic field perpendicular to the magnetic recording medium 2 is applied from the main pole 51, simultaneously with this, the AC magnetic field generated at the AC magnetic field generator 55 is applied to the magnetic recording medium 2. Because the AC magnetic field has the frequency in the microwave band, when reaching to the surface of the magnetic recording medium 2, the AC magnetic field changes its direction to a direction parallel to the film surface of the magnetic recording medium 2 without reaching a deep position in a thickness direction of the magnetic recording medium 2, and propagates in parallel in the vicinity of the surface of the magnetic recording medium 2. However, the AC magnetic field reaches the first magnetic layer 23 and the second magnetic layer 25, and is applied to these magnetic layers in their in-plane directions. As a result, the spin movement of the magnetic grains of the first and second magnetic layers 23 and 25 are promoted to reduce demagnetizing fields of the first and second magnetic layers 23 and 25, causing internal magnetic fields of magnetic layers made from an anisotropy magnetic field and a demagnetizing field to decrease, and thereby a state where the magnetization directions of these magnetic layers are more likely to rotate with respect to the external magnetic field is realized.

The recording magnetic field perpendicularly applied from the main pole 51 to the magnetic recording medium 2 functions to the first and second magnetic layers 23 and 25 in a state where the internal magnetic fields of the first and second magnetic layers 23 and 25 are lowered. In a typical pattern, the magnetization direction of the second magnetic layer 25 rotates in a direction perpendicular to the film surface of the magnetic recording medium 2 prior to the first magnetic layer 23. This is because the magnetization direction of the second magnetic layer 25 is more likely to rotate than the first magnetic layer 23 based on two reasons below. The first reason is that a larger AC magnetic field is more likely to be applied to the second magnetic layer 25 than to the first magnetic layer 23 because the second magnetic layer 25 is positioned on the surface side of the magnetic recording medium 2 (side closer to the magnetic head 3) than the first magnetic layer 23. The second reason is that Hk of the second magnetic layer 25 is smaller than that of the first magnetic layer 23. Then, due to the exchange coupling force through the nonmagnetic metal layer 24, the magnetization direction of the first magnetic layer 23 rotates in a direction perpendicular to the film surface of the magnetic recording medium 2. Because the internal magnetic field of the first magnetic layer 23 is also lowered due to the application of the AC magnetic field, the magnetization direction of the first magnetic layer 23 rotates easily even when the anisotropy energy of the second magnetic layer 25 is small.

The magnetic recording apparatus 1 using a microwave assisted effect and an ECC recording medium has following merits. First, because the microwave application allows the magnetization direction of the second magnetic layer 25 to more easily rotate, it is unnecessary to augment the recording magnetic field to let the magnetization direction of the second magnetic layer 25 rotate. Similarly, because applying microwave allows the magnetization direction of the first magnetic layer 23 to rotate more easily, it is unnecessary to augment the recording magnetic field to let the magnetization direction of the first magnetic layer 23 rotate more easily. As a result, it becomes possible to lower the recording magnetic field compared to the case without the microwave assisted effect, and this leads more simplification of the magnetic head 3, lower cost, and the reduction of power consumption.

When the same recording magnetic field is used, it is possible to increase Hks of the first and second magnetic layers 23 and 25. This leads the improvement of thermal stability of the entire magnetic recording medium 2, and thereby it becomes possible to increase an in-plane recording density. Although a detail description is given below, because a relative relation between Hks of the first and second magnetic layers 23 and 25 (Hk2/Hk1) is also not significantly restricted, flexibility of the film configuration of the magnetic recording medium 2 is increased.

Contrary to the above-described embodiment, also when the first magnetic layer 23 is positioned closer to the magnetic head 3 than the second magnetic layer 25 (the film configuration of FIG. 4B), the first and second magnetic layers 23 and 25 are magnetized in the similar pattern. Because the AC magnetic field functions to both the first and second magnetic layers 23 and 25, the magnetization direction of the second magnetic layer 25 with small Hk that is in a lower layer side rotates first due to the functions of the recording magnetic field and the AC magnetic field. Then, the magnetization direction of the first magnetic layer 23 in an upper layer side rotates due to the functions of the recording magnetic field and the AC magnetic field, and the exchange coupling force. Depending on the relation between Hk and the strength of the AC magnetic field, the magnetization direction of the first magnetic layer 23 in the upper layer side may rotate first, and then the magnetization direction of the second magnetic layer 25 in the lower layer side may rotate. In either of the patterns, because a state where the magnetization directions of the first and second magnetic layers 23 and 25 are more likely to rotate is realized due to the AC magnetic field, the magnetization directions of the first and second magnetic layers 23 and 25 can be rotated easily compared to a case where the AC magnetic field is not applied. As described above, the positional relation between the first magnetic layer 23 and the second magnetic layer 25 can be arbitrarily selected so that the flexibility of the film configuration of the magnetic recording medium 2 is further improved.

EXAMPLE

In order to quantitatively evaluate the microwave assisted effect, a magnetization state of a magnetic recording medium was analyzed as magnetization behavior of magnetic grains using an LLG equation that is an expression (1).

$$\frac{dM}{dt} = -\gamma M \times H_{\mathit{eff}} + \frac{\alpha}{M} M \times \frac{dM}{dt} \qquad (1)$$

Herein, $\gamma$ is the gyromagnetic constant, $\alpha$ is a damping constant, and $H_{\mathit{eff}}$ is an effective magnetic field. $H_{\mathit{eff}}$ is a sum of five components: an anisotropy magnetic field $Ha$ (($=Hk \cdot \cos\theta$, $\theta$ is an angle formed by a magnetization direction and a magnetization easy axis); a demagnetizing field Hd; an external magnetic field Hdc; a thermal magnetic field Hh; and a microwave magnetic field Hac.

The x-y-z coordinate system in the following description was as defined in FIG. 2. A composition and a film thickness for each layer were set as follows.

TABLE 1

| Name | Composition | Film Thickness |
|---|---|---|
| Lubricant Layer | Fluorine System | 0.5 nm |
| Protective Layer 26 | DLC | 3 nm |
| Second Magnetic Layer 25 | CoPtCr | 10 nm |
| Nonmagnetic Metal Layer 24 | Ru | 0.5 nm |
| First Magnetic Layer 23 | CoPtCr—SiO$_2$ | 5 nm |
| Nonmagnetic Metal Layer 22a | Ru | 20 nm |
| Soft Magnetic Under Layer 22 | CoFeTaZr | 40 nm |
| Substrate 21 | Glass | 0.6 mm |

A plane parallel to the magnetic recording medium 2 was indicated as the x-y plane, and a microwave magnetic field Hac was applied as a linear polarized magnetic field that oscillates in the x direction in the x-y plane. An initial magnetization direction of the magnetic recording medium 2 was indicated as the +z direction. An external magnetic field Hdc corresponding to a recording magnetic field applied from the recording head 3 was applied in the direction perpendicular to the recording surface of the magnetic recording medium 2 to a direction (−z direction) opposite to the initial magnetization (+z direction). The magnetization direction of the magnetic recording medium 2 is oriented from the +z direction to the −z direction, and reverses as performing a precession movement. The magnetic recording medium 2 was modeled using 2048 grains of isolated magnetic grains. In consideration of variances (variance of Hk: 10% and variance of angle: 3 degree) of these isolated magnetic grains, judgment of magnetization reversal was performed using a statistical procedure.

The microwave assisted effect was analyzed using this calculation model while a ratio (Hk2/Hk1) of an anisotropy magnetic field Hk2 of the second magnetic layer 25 to an anisotropy magnetic field Hk1 of the first magnetic layer 23 was changed. Hdc was set to 5000 Oe and Hac was set to 1000 Oe, and the frequency of the microwave magnetic field was changed in the range of 5-40 GHz. As an indicator of the microwave assisted effect, a magnetically reversed grain number (RGN) ratio (hereinafter, referred to as RGN ratio) was used. The RGN ratio was defined by "magnetically reversed grain number when microwave is applied (with microwave)/magnetically reversed grain number when microwave is not applied (without microwave)." A state where the RGN ratio exceeds 1 indicates that the microwave assisted effect has occurred.

Figure 5A:
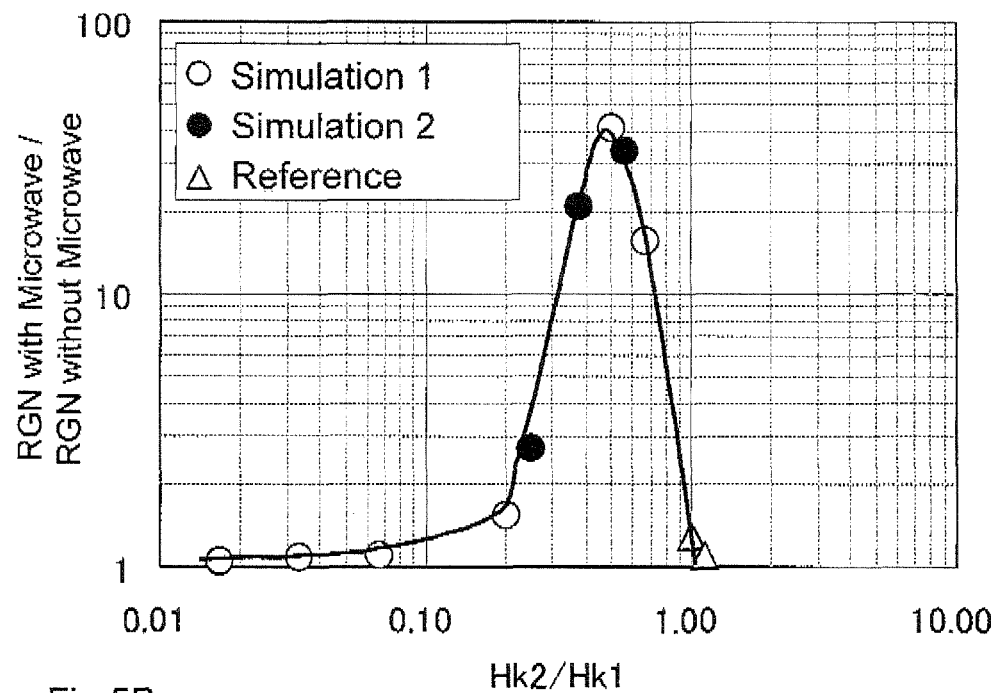
FIGS. 5A and 5B are views illustrating relations of the magnetically reversed grain number rate with respect to Hk2/Hk1.

FIG. 5A illustrates one example of the results. The configuration of the magnetic recording medium 2 is as illustrated in FIG. 4A, and the first magnetic layer 23 is positioned in a lower side (side far from the magnetic head 3) than the second magnetic layer 25. In the drawing, simulation 1 indicates a case where Hk1 is 30 kOe, and simulation 2 indicates a case where Hk1 is 16 kOe. From the drawing, the microwave assisted effect was observed in almost the entire range of Hk2/Hk1<1; however, more specifically, it is preferred that Hk2/Hk1 is 0.9 or less. Therefore, in the respective cases, a case when Hk1 and Hk2 are substantially the same (Hk2/Hk1=1) is used as a reference value.

On the other hand, when Hk2/Hk1 is small, the microwave assisted effect is small; when Hk2/Hk1 exceeds 0.2, the RGN ratio drastically raises. Therefore, it is preferred that Hk2/Hk1 is 0.2 or more.

In the region where Hk2/Hk1 is less than 0.2, the RGN ratio approaches to 1, even when the microwave is not applied, because the magnetization reversal occurs with a probability similar to the case when the microwave is applied. When Hk2/Hk1 approaches to one, Hks of the two magnetic layers raise together. Therefore, the magnetization reversal becomes less likely to occur in spite of existence or non-existence of applying microwave, and thereby the RGN ratio approaches to 1. From such reasons, there is an optimal range for the value of Hk2/Hk1. Also, both of the simulations 1 and 2 are plotted on the same characteristic curve. From the above description, it is preferred that Hk2/Hk1 is 0.2 or more and 0.9 or less without depending on an amount of Hk1. Specifically, in the range where Hk2/Hk1 is 0.3 or more and 0.7 or less, a prominent microwave assisted effect that the RGN ratio substantially exceeds 10 can be obtained.

Figure 5B:
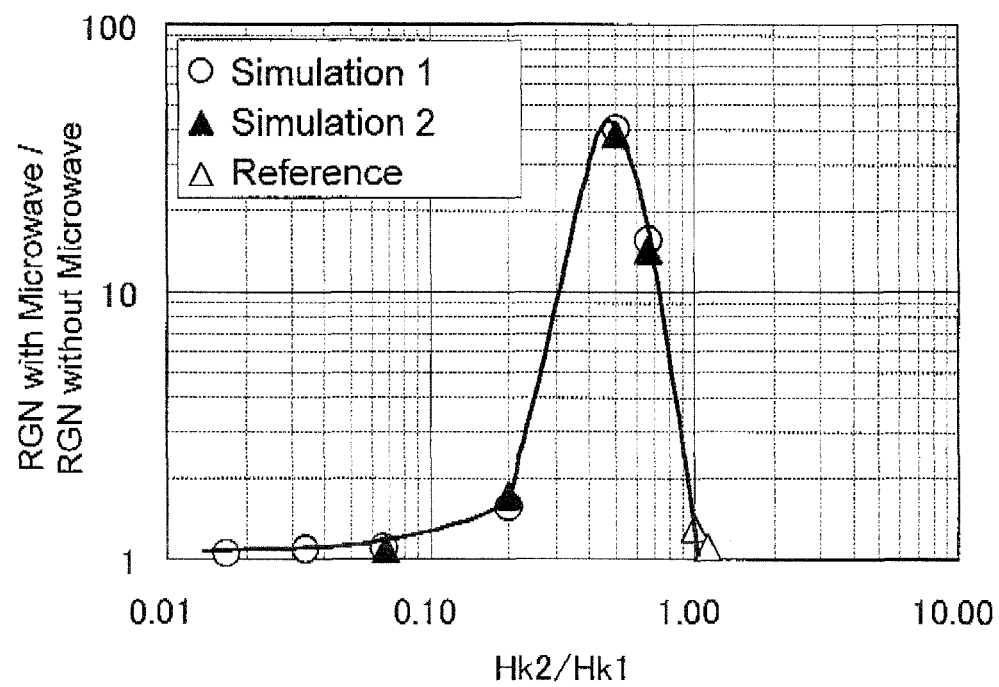

FIG. 5B illustrates results of the RGN ratio when the first magnetic layer 23 and the second magnetic layer 25 are switched to each other so that Hk of a magnetic layer in the upper layer side is larger than Hk of a magnetic layer in the lower side. The film configuration of the magnetic recording medium 2 is as illustrated in FIG. 4B, and the composition and the film thickness of each of the layers are the same as the case of the simulations illustrated in FIG. 5A. A simulation 1 indicates the case where Hk1 is 30 kOe, and a simulation 2 indicates the case where Hk1 is 16 kOe. The reference value in the drawing was defined the same as that in FIG. 5A. A graph with the characteristic plot which was almost the same as the case of FIG. 5A was obtained. Therefore, it is understood that either of the magnetic layers with large Hk or the magnetic layers with small Hk can be positioned in the upper layer side.

As has been already described, in the ECC magnetic recording medium having the magnetic layers with different Hk, generally, magnetization reversal occurs first in the magnetic layer with low Hk, and then magnetization reversal occurs in the high Hk magnetic layer. Thereby, the magnetization reversal of the entire recording layers is completed. Accordingly, the magnetization reversal of the entire recording layers largely depends on behavior of the high Hk magnetic layer. Herein, an optimal value of Hk1 in the above-described range of Hk2/Hk1 was obtained. Three cases of Hk2/Hk1, which were 0.2, 0.5, and 0.9, were used.

Figure 6A:
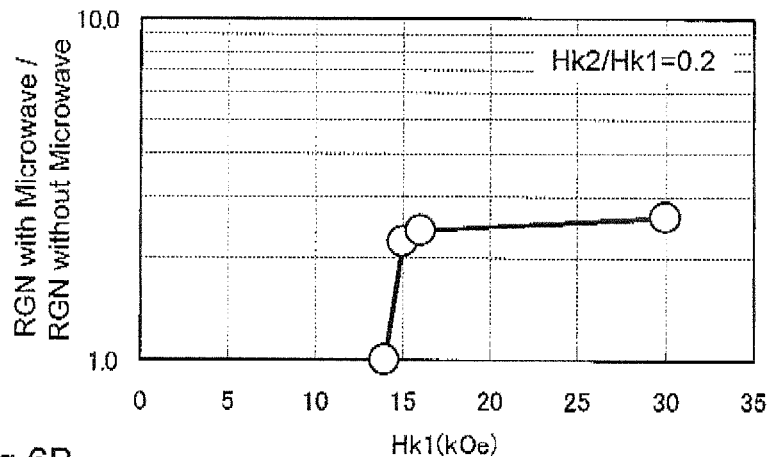
FIGS. 6A-6C are views illustrating lower limit values of Hk1 for variety of Hk2/Hk1.
Figure 6B:
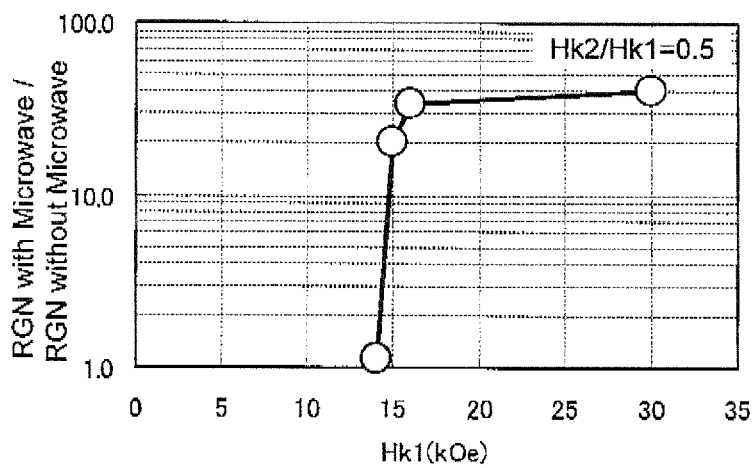
Figure 6C:
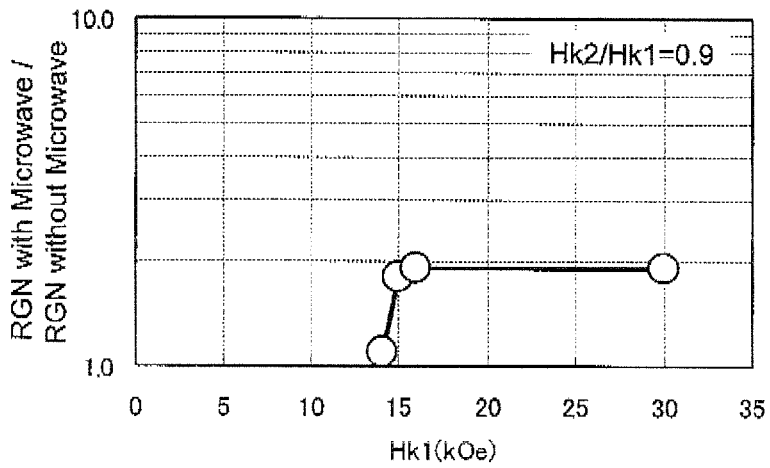

FIGS. 6A, 6B, and 6C each illustrates the RGN ratio in the range where Hk1 is small, and respectively correspond to the cases that Hk2/Hk1 are 0.2, 0.5, and 0.9. In each of the cases, the RGN ratio is approximately 1 in the range where Hk1 is smaller than 15 kOe. This is because the small Hk allows the magnetization reversal to occur easily even when the microwave is not applied. Also, in each of the cases, the RGN ratio drastically raises in the vicinity of Hk1=15 kOe, and the effect of applying the microwave remarkably emerges.

Figure 7A:
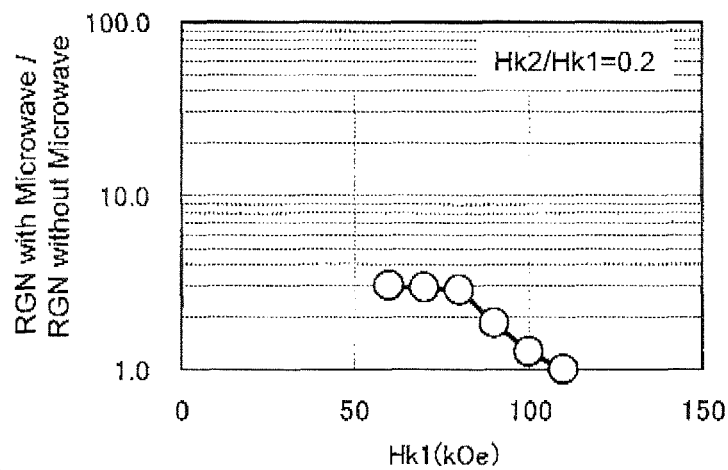
FIGS. 7A-7C are views illustrating upper limit values of Hk1 for variety of Hk2/Hk1.
Figure 7B:
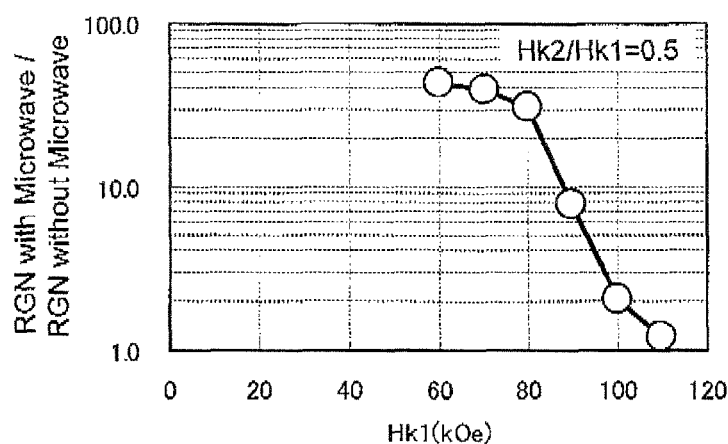
Figure 7C:
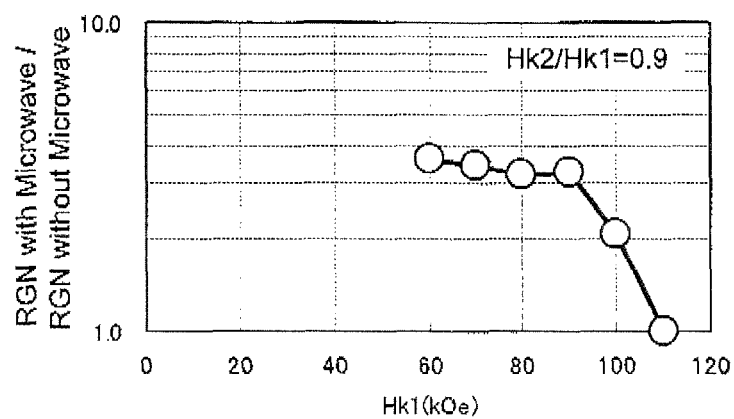

FIGS. 7A, 7B, and 7C each illustrates the RGN ratio in the range where Hk1 is large, and respectively correspond to the cases that Hk2/Hk1 are 0.2, 0.5, and 0.9.

In the case of Hk2/Hk1=0.2, it is observed that the RGN ratio drastically decreases when Hk1 exceeds 80 kOe. In the ECC magnetic recording medium, magnetization reversal in the high Hk1 magnetic layer occurs using force of magnetization reversal in the low Hk magnetic layer; however, in this case, because Hk2 is only one fifth of Hk1, anisotropy energy (ku) that the low Hk magnetic layer has is small. Therefore, it becomes difficult to cause the magnetization reversal in the high Hk magnetic layer when Hk1 exceeds a certain threshold.

In the case of Hk2/Hk1=0.5, the RGN ratio is higher than the other cases. Under the analysis conditions, Hk of the magnetic layer with lower Hk is 30 kOe or more (Hk1=60 kOe), so that it is impossible to cause sufficient magnetization reversal only with the recording magnetic field; however, it is possible to cause the magnetization reversal using the microwave assist. Because the low Hk magnetic layer in which the magnetization has reversed has the large Hk2, anisotropy energy is high, and moreover, the magnetization reversal in the high Hk magnetic layer can occur easily because the microwave assisted effect also reaches to the high Hk magnetic layer as well. Therefore, in this case, the significantly large RGN ratio can be obtained. When Hk1 exceeds 80 kOe, the drastic decrease of the RGN ratio is observed.

In the case of Hk2/Hk1=0.9, Hk2 is relatively large compared to the other cases so that anisotropy energy of the low Hk1 magnetic layer becomes high. Therefore, once magnetization reversal in the low Hk magnetic layer is achieved using microwave, it becomes easy to achieve the magnetization reversal in the high Hk magnetic layer as well. Accordingly, the microwave assisted effect occurs until the vicinity of Hk1=90 kOe. When passing through Hk1=90 kOe, the drastic decrease of the RGN ratio is observed.

From the above description, it was understood that a critical effect of the microwave assist was observed when Hk1 was 80 kOe (6366 kA/m) or less. Also in principle, because the smaller Hk of the low Hk magnetic layer is, the smaller the force to cause the magnetization reversal in the high Hk magnetic layer becomes, the upper limit value in the range of Hk2/Hk1=0.2-0.9 is defined using the upper limit value of Hk1 in the case of Hk2/Hk1=0.2.

While some preferred embodiments of the present invention have been shown and described in detail, and it is to be understood that variety of changes and modifications may be made without departing from the spirit of the following claims or its scope.

What is claimed is:

1. A magnetic recording apparatus, comprising:
a magnetic recording medium that is provided with
a first magnetic layer with magneto crystalline anisotropy energy,
a second magnetic layer with magneto crystalline anisotropy energy that is smaller than the magneto crystalline anisotropy energy of the first magnetic layer, and
a nonmagnetic metal layer that is positioned between the first magnetic layer and the second magnetic layer and that provides coupling force between the first magnetic layer and the second magnetic layer; and
a magnetic head that includes
a main pole that applies a recording magnetic field in a direction perpendicular to a film surface of the magnetic recording medium to the magnetic recording medium, and
an alternate current (AC) magnetic field generator that applies an AC magnetic field with a frequency of 1-40 GHz to the magnetic recording medium.

2. The magnetic recording apparatus according to claim 1, wherein the first magnetic layer is positioned closer to the magnetic head than the second magnetic layer is.

3. The magnetic recording apparatus according to claim 1, wherein the second magnetic layer is positioned closer to the magnetic head than the first magnetic layer is.

4. The magnetic recording apparatus according to claim 1, wherein a ratio of magneto crystalline anisotropy energy of the second magnetic layer to magneto crystalline anisotropy energy of the first magnetic layer is in the range of 0.2 or more and 0.9 or less.

5. The magnetic recording apparatus according to claim 1, wherein a ratio of magneto crystalline anisotropy energy of the second magnetic layer to magneto crystalline anisotropy energy of the first magnetic layer is in the range of 0.3 or more and 0.7 or less.

6. The magnetic recording apparatus according to claim 1, wherein magneto crystalline anisotropy energy of the first magnetic layer is in the range of 1193 kA/m or more and 6366 kA/m or less.

7. The magnetic recording apparatus of claim 1, wherein a second thickness of the second magnetic layer with respect to a lamination direction is greater than a first thickness of the first magnetic layer with respect to the lamination direction.

8. The magnetic recording apparatus of claim 7, wherein a thickness ratio of the second thickness to the first thickness is substantially 2.

9. The magnetic recording apparatus of claim 1, wherein the magnetic head has an AC magnetic field-generating element configured to apply the AC magnetic field of the frequency 1-40 GHz in the inside surface direction of the record medium parallel to the magnetic layer of the record medium.

10. A microwave-assisted magnetic recording apparatus, comprising:
a magnetic recording medium that is provided with
a first magnetic layer with a first magneto crystalline anisotropy energy,
a second magnetic layer with a second magneto crystalline anisotropy energy that is smaller than the first magneto crystalline anisotropy energy, and
a nonmagnetic metal layer that is positioned between the first magnetic layer and the second magnetic layer and that provides coupling force between the first magnetic layer and the second magnetic layer; and
a magnetic head that includes
a main pole that applies a recording magnetic field in a direction perpendicular to a film surface of the magnetic recording medium to the magnetic recording medium, and
an alternate current (AC) magnetic field generator that applies an AC microwave-band magnetic field with a frequency of 1-40 GHz to the magnetic recording medium.

11. The microwave-assisted magnetic recording apparatus according to claim 10, wherein magneto crystalline anisotropy energy of the first magnetic layer is in the range of 1193 kA/m or more and 6366 kA/m or less.

12. The microwave-assisted magnetic recording apparatus of claim 10, wherein
the magnetic head has an AC magnetic field-generating element configured to apply the AC magnetic field of the frequency 1-40 GHz in the inside surface direction of the record medium parallel to the magnetic layer of the record medium.

* * * * *